United States Patent
Singhal et al.

(10) Patent No.: US 10,192,582 B2
(45) Date of Patent: Jan. 29, 2019

(54) AUTOMATIC GENERATION OF TIME-LAPSE VIDEOS

(71) Applicant: ADOBE SYSTEMS INCORPORATED, San Jose, CA (US)

(72) Inventors: Puneet Singhal, New Delhi (IN); Abhishek Shah, Delhi (IN)

(73) Assignee: ADOBE INC., San Jose, WA (US)

( * ) Notice: Subject to any disclaimer, the term of this patent is extended or adjusted under 35 U.S.C. 154(b) by 375 days.

(21) Appl. No.: 14/719,170

(22) Filed: May 21, 2015

(65) Prior Publication Data

US 2016/0343402 A1    Nov. 24, 2016

(51) Int. Cl.
| | |
|---|---|
| *H04N 5/783* | (2006.01) |
| *G11B 27/00* | (2006.01) |
| *G11B 27/031* | (2006.01) |
| *G06K 9/00* | (2006.01) |

(52) U.S. Cl.
CPC .......... *G11B 27/005* (2013.01); *G11B 27/031* (2013.01); *H04N 5/783* (2013.01); *G06K 9/00751* (2013.01); *G06K 2009/00738* (2013.01)

(58) Field of Classification Search
CPC .... G11B 27/005; G11B 27/031; H04N 5/783; G06K 9/00751; G06K 2009/00738
USPC ....................................................... 386/226
See application file for complete search history.

(56) References Cited

U.S. PATENT DOCUMENTS

| | | | | |
|---|---|---|---|---|
| RE35,414 E | * | 12/1996 | Murakami | G06T 9/008 348/420.1 |
| 2006/0204236 A1 | * | 9/2006 | Sasaki | G02B 21/008 396/265 |
| 2008/0240589 A1 | * | 10/2008 | Hsu | H04N 5/23248 382/236 |
| 2013/0188874 A1 | * | 7/2013 | Wu | H04N 9/3129 382/197 |
| 2015/0002691 A1 | * | 1/2015 | Ishihara | H04N 5/23229 348/222.1 |
| 2015/0116517 A1 | * | 4/2015 | Kinoshita | H04N 5/23219 348/208.6 |

* cited by examiner

*Primary Examiner* — William C Vaughn, Jr.
*Assistant Examiner* — Jae N Noh
(74) *Attorney, Agent, or Firm* — Shook, Hardy & Bacon, L.L.P.

(57) ABSTRACT

Embodiments of the present invention provide systems, methods, and computer storage media directed to operations to facilitate generation of time-lapse videos. In accordance with embodiments described herein, frames of a photographic input are analyzed to detect activity occurring across frame pairs. The photographic input, such as video input, is input for which a time-lapse video is to be generated. Activity detected across frame pairs is used to automatically select a plurality of the frames for use in generating the time-lapse video. At least a portion of the frames selected in accordance with the activity detected across frame pairs is used to generate the time-lapse video.

20 Claims, 5 Drawing Sheets

AUTOMATIC GENERATION OF TIME-LAPSE VIDEOS

BACKGROUND

Time-lapse photography is becoming increasingly popular as individuals seek to portray time as appearing to move faster, particularly with the advancement of wearable or mountable cameras (e.g., GoPro® cameras). Time-lapse photography is a technique in which the frequency at which film frames are captured (frame rate) is lower than that used to view the sequence. In essence, time-lapse photography creates a perception that is opposite of slow motion. Using time-lapse photography can create an effect of a pronounced motion based on a subtle process or transition. For example, time-lapse photography can be used to capture and present transitions related to the sky, plants growing, progression of construction, other environmental processes, and the like. Similarly, time-lapse photography can create a stream of activity associated with quicker transformations, such as crowds and traffic.

To generate a time-lapse video, however, requires an extensive amount of time of manual editing to select frames from raw footage. Frame selection from lengthy raw footage to generate a time-lapse video can be tedious and time consuming for users. Some services have been developed to assist with automated solutions to generate time-lapse videos. With such conventional implementations, a frame is extracted at regular or constant time intervals or frame intervals (e.g., selected by a user) and, thereafter, compiled for video output. Extracting frames at regular or constant intervals, however, may result in missing a portion of a captured video that is of interest. In this regard, a more dynamic or interesting portion of a captured video may be substantially reduced or entirely missed when frames are extracted at a regular interval for incorporation into a time-lapse video. For instance, using a constant interval to select frames can result in omitting important events if the time lapse interval is set too large or creating a lengthy output with redundant frames if the interval is set too small.

SUMMARY

Embodiments of the present invention relate to facilitating automatic generation of a time-lapse video. As described in embodiments herein, frames are automatically selected for a time-lapse video based, at least in part, on interesting aspects or activity of the captured video. In this regard, interesting aspects or activity of a photographic input are detected, for example, based on motion and/or color changes detected between frames of the photographic input. The interesting aspects of the photographic input can then be used to automatically select frames to compile for a time-lapse video. Utilizing such an approach to select frames can result in a time-lapse video containing more dynamic aspects of the photographic input that may be of interest to a viewer.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
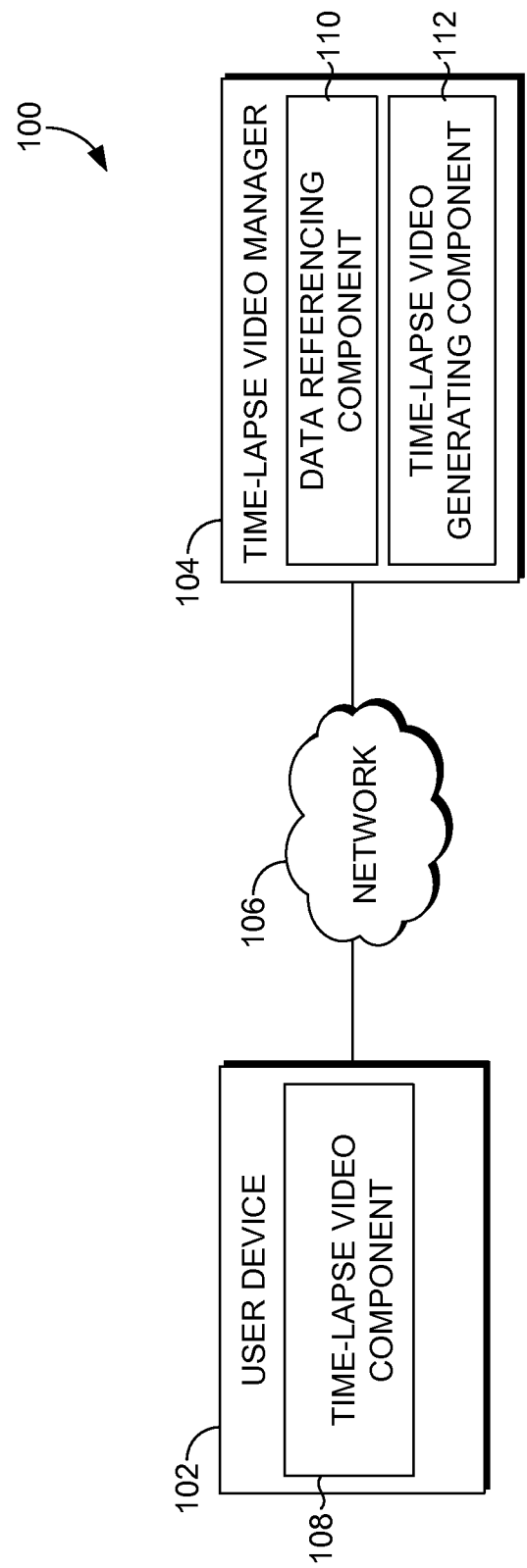
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Time-lapse photography is a technique whereby the frequency at which film frames are captured (the frame rate) is lower than that used to view the sequence. In this regard, when a time-lapse video is played at normal speed, time appears to be moving faster and thus lapsing. By way of example, assume that an image of a scene is captured and a frame is selected therefrom once every second to generate a time-lapse video. If the time-lapse video is played back at 30 frames per second, the result is an apparent 30 times speed increase, which is essentially the opposite of a replay in slow motion.

Time-lapse photography is oftentimes used to as a technique to present processes in a pronounced manner that might otherwise appear subtle to a viewer. In this regard, time-lapse photography can be used to create an effect of a prominent motion from an imperceptibly slow process. For example, time-lapse photography can be used to capture and present the sky, plants growing, progression of construction, or the like. Similarly, time-lapse photography can create a stream of activity associated with quicker transformations, such as crowds and traffic. Recently, time-lapse videos have become popular based on footage captured by GoPro® cameras. Generally, GoPro® cameras are wearable or mountable cameras that can be used to capture action related activities, such as skiing, snowboarding, driving, etc. Using a wearable or mountable camera, such as a GoPro® camera, can result in a perception of a stream of activity.

Some services have been developed to assist with generating time-lapse videos. With such conventional implementations, a frame is extracted at regular time intervals or frame intervals and, thereafter, compiled for video output. Extracting frames at regular intervals, however, may result in missing a portion of a captured video that may be of interest to a viewer. In this regard, a more dynamic or interesting portion of a captured video may be substantially reduced or entirely missed when frames are extracted at a regular interval to generate a time-lapse video. For example, assume that a video captures traffic for a 24-hour time period, and a time-lapse video is desired to be five minutes. Using a conventional implementation, frames are selected in equal portions throughout the 24-hour time period. As such, 2.5 minutes of a resulting time-lapse video correspond to the first twelve hours of filming, and 2.5 minutes of the resulting time-lapse video correspond to the second twelve hours of filming. In the event that the first twelve hours of filming captures more dynamic aspects, however, interesting portions of the first twelve hours may be reduced or entirely missed from the resulting time-lapse video, while uninteresting or inactive portions may be redundant from the second twelve hours of filming.

Embodiments of the present invention relate to facilitating automatic generation of a time-lapse video. In particular, time-lapse videos are generated based on aspects of a photographic input deemed as interesting, that is, that reflect some aspect of change or activity. As described in embodiments herein, frames of a photographic input are selected for a time-lapse video based, at least in part, on interesting aspects of the photographic input (e.g., captured video). In this regard, interesting aspects or activity of a photographic input can be automatically detected and used to select frames to compile as a time-lapse video. In some implementations, interesting aspects of the captured video are detected based on motion and/or color changes detected between frames. Detection of such motion and/or color change is used to select frames of the photographic input for use in generating a time-lapse video. The selected frames, at least some of which are based on interesting aspects of the photographic input, are compiled to generate a time-lapse video. As such, the time-lapse video may include more dynamic or interesting aspects for a viewer.

By way of example, instead of selecting frames at regular intervals, aspects of the invention select frames based on the detection of interesting points within a photographic input (e.g., a captured video). Assume that a video captures traffic for a 24-hour time period, and a time-lapse video is desired to be five minutes. Further assume that the first twelve hours contain more interesting traffic patterns than the second twelve hours of captured video. In accordance with aspects of the present invention, more frames are selected from the first twelve hours of video raw footage than the second twelve hours of video raw footage based on the elevated activity level occurring in the first twelve hours. As such, four minutes of the resulting five minute time-lapse video may include frames from the first twelve hours, while only one minute of the resulting five minute time-lapse video may include frames from the second twelve hours.

At a high level, frames used to generate a time-lapse video can be selected based on analysis points, events, or activity of interest related to one or more interest attributes. That is, photographic inputs can be analyzed to identify portions of the input associated with an attribute of interest, for example, as indicated by a user or as a default for monitoring. Detection of activity associated with an interest attribute (e.g., motion and/or color) can be performed in any manner. To detect movement or motion, generally, movement or motion can be detected based on movement of a point(s) between frames, such as a pair of consecutive frames in an input video. To detect change or transition of color or luminance between frames, color or luminance can be detected based on changes across frames, such as a pair of consecutive frames in an input video. In some embodiments, multiple interest attributes may be analyzed to select frames for inclusion in a time-lapse video. In such cases, the amount of change associated with each interest attribute can be calculated, and the amount of change associated with each interest attribute can be aggregated to arrive at a single indication of activity or change associated with a particular frame or frame pair. By way of example, and without limitation, assume that interest attributes of movement and color are monitored for use in selecting frames for a time-lapse video. As such, the attribute of color change and the attribute of motion can be aggregated together to arrive at a single variable describing activity associated with a frame or frame pair. In accordance with detecting activity within the photographic input, a set of one or more frames can be selected to include in the time-lapse video. In this manner, and as described in more detail, at least a portion of the frames selected for inclusion in a time-lapse video are based on extent of activity occurring in association therewith.

Although the description provided herein is generally directed to photographic input being a video input, as can be appreciated, the photography input described herein could be other types of input generated by any type of camera. For example, a digital single-lens reflex camera (SLR or DSLR) may be used to capture images that can be selected and used to generate a time-lapse video.

Turning now to FIG. 1, a block diagram is provided illustrating an exemplary environment 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the environment 100 may include a user device 102 and a time-lapse video manager 104. It should be understood that the environment 100 shown in FIG. 1 is an example of one suitable computing system environment. Each of the components shown in FIG. 1 may be implemented via any type of computing device, such as computing device 500 described with reference to FIG. 5, for example. The components may communicate with each other via a network 106, which may include, without limitation, one or more local area networks (LANs) and/or wide area networks (WANs). Such networking environments are commonplace in offices, enterprise-wide computer networks, intranets, and the Internet.

It should be understood that any number of user devices and time-lapse video managers may be employed within the computing environment 100 within the scope of the present invention. Each may comprise a single device or multiple devices cooperating in a distributed environment. For instance, the time-lapse video manager 104 may be provided via multiple devices arranged in a distributed environment that collectively provide the functionality described herein. Additionally, other components not shown may also be included within the network environment.

The user device 102 may be any type of device suitable for facilitating generation and/or presentation of a time-lapse video. Such computing devices may include, without limitation, a computer such as computing device 500 described below with reference to FIG. 5. Other types of display devices may include tablet PCs, PDAs, mobile phones, smart phones, as well as conventional display devices such as televisions. Although not shown, the user device 102 can include a display screen configured to display information to the user of the user device 102, for instance, information relevant to generating and/or viewing a time-lapse video.

Generally, the user device 102 includes a time-lapse video component 108 that is used to initiate generation of and/or view a time-lapse video. The time-lapse video component 108 can be in any form being executed on the user device 102. For instance, the time-lapse video component 108 can operate by way of a web browser executing on the user device 102 or as an application, or portion thereof, being executed on the user device 102.

The time-lapse video component 108 can enable a user to initiate generation of a time-lapse video. As such, a user operating user device 102 may indicate via a graphical user interface a desire to generate and/or view a time-lapse video. For instance, a user may select an icon to generate a time-lapse video from a particular photographic input. Photographic input generally refers to video input but may be any type of photographic input that can be used to generate a time-lapse video. In some cases, a graphical user interface presented via the user device 102 allows a user to select the particular photographic input from which the time-lapse video is desired to be generated. In this regard, the user may select or otherwise provide a photographic input for use in generating a time-lapse video. For example, a user interface presented via a web browser or application may be provided through which a user may select or provide a particular photographic input for generating a time-lapse video.

In embodiments, the time-lapse video component 108 can also be configured to facilitate obtaining user preferences regarding time-lapse video parameters for use in generating a time-lapse video. Time-lapse video parameters refer to parameters, preferences, or characteristics associated with a time-lapse video to be generated. By way of example only, a time-lapse video parameter may be a time-lapse video length, a threshold of change, a void constraint, an interest attribute(s), or the like. An output video length refers to a length of video desired for the time-lapse video. A time-lapse video length can be provided in various forms, such as in terms of time (e.g., 20 seconds, 5 minutes and 30 seconds, etc.), number of frames (e.g., 100 frames, 250 frames, etc.), a proportion of the photographic input (e.g., 1/20 of the input video), or the like. A threshold of change refers to an amount of change related to an interest attribute (e.g., movement) or set of attributes (e.g., movement and color), upon which a frame selection is desired. A void constraint refers to a video length, for example, designated in time or number of frames, after which a frame should be selected. In other words, the void constraint is intended to avoid too much time lapsing without selecting a frame for usage in the time-lapse video. An interest attribute refers to an attribute that is desired for which to base the interest of frame selection for the time-lapse video. For instance, an interest attribute might be motion/movement or color/luminance. Other interest attributes related to change between frames (e.g., consecutive frames) are also considered within the scope of embodiments described herein.

Time-lapse video parameters can be designated or selected in any number of manners. For example, parameters might be provided or selected via a graphical user interface by the user wishing to generate a time-lapse video. A user may access parameter options via a browser or application running on the user device 102. A user may be provided with options to select any number of parameters. By way of example, and not limitation, a user may select a preferred interest attribute(s) for which to use as a basis for generating a time-lapse video, a user may select to generate a time-lapse video selecting frames based on interest and not at a regular interval, a user may designate a desired length of a time-lapse video (e.g., via total time, total frames, proportion of input video, etc.), a user may designate a desired void constraint, or the like.

Photographic input and/or parameters selected by a user can be provided by the user device to the time-lapse video manager 104 via network 106, for example, at any time and in any manner. For instance, photographic input and selected parameters may be provided to the time-lapse video manager 104 over the network 106 upon a selection by the user to generate a time-lapse video using the provided input and parameters.

As described in more detail below, the time-lapse video component 108 can additionally or alternatively facilitate viewing of a generated time-lapse video. As such, upon generation of a time-lapse video, the time-lapse video can be presented via the user device 102.

The time-lapse video manager 104 shown in FIG. 1, as described more fully below, may be any type of computing device, such as, for example, computing device 500 described below with reference to FIG. 5. By way of example only and not limitation, the time-lapse video manager 104 may be a personal computer, desktop computer, laptop computer, handheld device, mobile handset, consumer electronic device, a server, a cluster of servers, or the like. It should be noted, however, that embodiments are not limited to implementation on such computing devices, but may be implemented on any of a variety of different types of computing devices within the scope of embodiments hereof.

Components of the time-lapse video manager 104 may include, without limitation, a processing unit, internal system memory, and a suitable system bus for coupling various system components, including one or more data stores for storing information (e.g., files and metadata associated therewith). The time-lapse video manager 104 typically includes, or has access to, a variety of computer-readable media. By way of example, and not limitation, computer-readable media may include computer-storage media and communication media. The computing system environment 100 is merely exemplary. While the time-lapse video manager 104 is illustrated as a single unit, one skilled in the art will appreciate that the time-lapse video manager 104 is scalable. For example, the time-lapse video manager 104 may in actuality include a plurality of computing devices in communication with one another. The single unit depictions are meant for clarity, not to limit the scope of embodiments in any form. As another example, the components described herein can be included in the user device such that the user device performs, e.g., via the time-lapse video component, the functionality of generating a time-lapse video.

As shown in FIG. 1, the time-lapse video manager 104 comprises a data referencing component 110 and a time-lapse video generating component 112. In some embodiments, one or more of the components 110 and 112 may be implemented as stand-alone applications. In other embodiments, one or more of the components 110 and 112 may be integrated directly into the operating system of a computing device such as the computing device 500 of FIG. 5. It will be understood by those of ordinary skill in the art that the components 110 and 112 illustrated in FIG. 1 are exemplary in nature and in number and should not be construed as limiting. Any number of components may be employed to achieve the desired functionality within the scope of embodiments hereof. It should be understood that this and other arrangements described herein are set forth only as examples.

The data referencing component 110 is generally configured to reference data used to generate a time-lapse video. In embodiments, the data referencing component 110 references photographic input from which a time-lapse video is based. Photographic input refers to any type of photography that is used to generate a time-lapse video. Photographic input generally refers to a film or video from which a time-lapse video is generated, but is not intended to be limited hereto and may be, for example, a series of still images, etc. In some cases, a static camera may be used to capture the photographic input. In other cases, a camera in motion may be used to capture the photographic input, for example, such as a GoPro® camera attached or mounted to a moving object (e.g., a person, vehicle, etc.).

Photographic input can be obtained in any manner and is not intended to be limited to embodiments described herein. In some cases, photographic input can be provided via a user desiring to generate a time-lapse video, such as a user associated with user device 102. In this regard, the user may select or otherwise provide a video to the time-lapse video manager 104 via the network 106. For example, as described above, a user interface via a web browser or application may be provided on the user device 102 through which a user may select to provide a photographic input (e.g., video) for generating a time-lapse video. As another example, a particular video previously provided to the time-lapse video manager 104 may be selected by the user operating user device 102. In yet other embodiments, photographic input may be provided by a third-party, a provider of the time-lapse video manager, a web server, etc.

Photographic input may be stored in relation to the time-lapse video manager 104 such that it is accessible to the time-lapse video manager 104 to utilize in generating a time-lapse video. For instance, a set of photographic inputs may be stored in a data store (not shown) accessible to the time-lapse video manager 104. The data store may be directly accessible (e.g., via a HDMI line) or accessible over a network, such as the Internet or intranet.

The data referencing component 110 may also be configured to reference and/or obtain time-lapse video parameters. Time-lapse video parameters refer to parameters, preferences, or characteristics associated with a time-lapse video to be generated. By way of example only, a time-lapse video parameter may be a time-lapse video length, a threshold of change, a void constraint, an interest attribute(s), or the like. An output video length refers to a length of video desired for the time-lapse video. A time-lapse video length can be provided in various forms, such as in terms of time (e.g., 20 seconds, 5 minutes and 30 seconds, etc.), number of frames (e.g., 100 frames, 250 frames, etc.), a proportion of the input photography (e.g., 1/20 of the input video), or the like. A threshold of change refers to an amount of change related to an interest attribute (e.g., movement) or set of interest attributes (e.g., movement and color), upon which a frame selection is desired. A void constraint refers to a video length, for example, designated in time or number of frames, after which a frame should be selected. In other words, the void constraint is intended to avoid too much time lapsing without selecting a frame for usage in the time-lapse video. An interest attribute refers to an attribute that is desired for which to base the interest of frame selection for the time-lapse video. For instance, an attribute of interest might be motion/movement or color/luminance. Other attributes that may change between frames are also considered within the scope of embodiments described herein.

Time-lapse video parameters can be designated or selected in any number of manners. As described above, time-lapse video parameters may be provided or selected by a user, for example, a user of user device 102 of FIG. 1. As another example, any number of parameters might be default parameters that are designated, for instance, by the developer or provider of the time-lapse video manager. The parameters may be stored, for example, in a data store accessible by the time-lapse video manager 104. As can be appreciated, in some cases, parameters may be stored in association with a particular time-lapse video, a particular photographic input, a particular user, or the like.

The time-lapse video generating component 112 is generally configured to generate a time-lapse video using a photographic input. In this regard, the time-lapse video generating component 112 can generate a time-lapse video using the photographic and any time-lapse video parameters (which may be designated or default values).

Initially, the time-lapse video generating component 112 can analyze the photographic input to detect points, events, or activity of interest related to one or more interest attributes. That is, photographic inputs can be analyzed to identify portions of the input associated with an attribute of interest, for example, as indicated by a user or as a default for monitoring. Detection of activity associated with an interest attribute can be performed in any manner. Exemplary methods in which to detect attributes of interest are described herein, but are not intended to limit the scope of implementations. Further, although detection of motion and color related attributes are described herein, any type of attribute can be detected and, as such, used to generate time-lapse videos.

To detect movement or motion, various implementations may be employed. In some embodiments, a point tracker algorithm(s) can be used. One example of a point tracker algorithm is the Kanade-Lucas-Tomasi (KLT) algorithm, which can be used to track points in a video. Generally, movement or motion is detected based on movement of a point(s) between frames, such as a pair of consecutive frames in an input video. To detect movement or motion, a point or set of points to track can be determined or identified. As can be appreciated, any number of interesting points within frames may be tracked. Further, any number of interesting points associated with an object (e.g., individual, vehicle, etc.) within a frame can be tracked. In some cases, a predetermined number of points may be tracked. In other cases, points associated with objects identified as a moving object, a potential moving object, a primary object, a relevant object, or the like, may be tracked. For example, in a video input in which three objects (e.g., individuals) are moving, three points may be selected to track or monitor the various moving objects. Interesting points might be associated with any type of movement. In some cases, a threshold of movement may be used to select objects or points to track. For example, a slight variability in movement might not be tracked. Although a point of interest or interest point is generally described herein in relation to a moving object, implementations are not intended to be limited hereto.

A point tracker algorithm, such as the Kanade-Lucas-Tomasi (KLT) algorithm, can track various points in a video frame and identify an extent to which the points move. In this regard, each of the frames within a photographic input can be analyzed to track points. In particular, in some cases, each pair of consecutive frames can be analyzed to identify movement. For example, assume a photographic input includes 1000 frames. In such a case, each of the 1000 frames can be analyzed to track point movement between each consecutive pair of frames. For instance, an absolute distance of movement x of a first point can be determined between the first frame and the second frame. A distance moved in association with each interest point between the first frame and the second frame can be determined to arrive at a distance of movement x associated with each point. That is, each interest point identified to be tracked can be associated with distance of movement x from the first frame to the second frame.

To calculate an aggregate distance of motion X between the first frame and the second frame, the detected distances x associated with each of the tracked points can be aggregated (e.g., summed, averaged, etc.). By way of example only, the movement of points between consecutive frames can be totaled to arrive at an aggregate distance of motion. For instance, assume consecutive frames 1 and 2 are analyzed in which three points of interest exist to correspond with three objects (e.g., individuals). In such a case, a first distance $x_1$ is determined for a first point corresponding with a first object, a second distance $x_2$ is determined for a second point corresponding with a second object, and a third distance $x_3$ is determined for a third point corresponding with a third object. Each of the three distances, $x_1$, $x_2$, and $x_3$ can be aggregated to calculate a total amount of movement X between consecutive frames 1 and 2. As such, for the pair of the first and second consecutive frames, the sum of all distances of movements of points between frames is denoted as X. As can be appreciated, the aggregate movement X can be associated with frame 1, frame 2, both frame 1 and 2, or the pair of frames 1 and 2.

Such movement detection between frames can be performed for each pair of consecutive frames within the photographic input. As such, a total amount of movement X can be calculated for each pair of consecutive frames. In this regard, $X_1$ can be calculated as the aggregate movement between frame 1 and frame 2, $X_2$ can be calculated as the aggregate movement between from frame 2 and frame 3, $X_3$ can be calculated as the aggregate movement between frame 3 and frame 4, and so on.

As previously described, change or transition of color or luminance between frames can also be detected as an attribute of interest. Generally, color or luminance is detected based on changes across frames, such as a pair of consecutive frames in an input video. In this regard, color or luminance change L between each pair of consecutive frames can be determined. Any color or luminance change algorithms can be employed to detect such changes between frames. Color or luminance changes can be detected in accordance with analyzing any aspect of frames, such as an edge of the frame, a center of the frame, an average or median of multiple points in a frame, etc. As can be appreciated, in cases in which multiple points are monitored with regard to color or luminance between frames, various color or luminance changes l associated with multiple points can be identified and aggregated (e.g., summed, averaged, etc.) together to arrive at an aggregate color or luminance change L. As can be appreciated, the aggregate color or luminance change L can be associated with frame 1, frame 2, both frame 1 and 2, or the pair of frames 1 and 2.

Such color or luminance change detection between frames can be performed for each pair of consecutive frames within the photographic input. As such, a total amount of color or luminance change L can be calculated for each pair of consecutive frames. In this regard, $L_1$ can be calculated as the aggregate amount of color or luminance change between frame 1 and frame 2, $L_2$ can be calculated as the aggregate amount of color or luminance change between frame 2 and frame 3, $L_3$ can be calculated as the aggregate amount of color or luminance change between frame 3 and frame 4, and so on.

As previously described, in some embodiments, multiple interest attributes may be analyzed to select frames for inclusion in a time-lapse video. In such cases, the amount of change associated with each interest attribute can be calculated. In some embodiments, the amount of change associated with each interest attribute can be aggregated to arrive at a single indication of activity or change associated with a particular frame or frame pair. By way of example, and without limitation, assume that interest attributes of movement and color are monitored for use in selecting frames for a time-lapse video. As such, the attribute of color change and the attribute of motion can be aggregated together to arrive at a single variable describing activity associated with a frame or frame pair. In particular, the amount of movement X and the amount of color change L for a pair of consecutive frames can be aggregated, totaled, averaged, or otherwise calculated to arrive at a value W that represents activity or interest associated with the amount of change between two frames.

Such an aggregate amount of change W detected between frames can be performed for each pair of consecutive frames within the photographic input. As such, a total amount of change W can be calculated for each pair of consecutive frames. In this regard, $W_1$ can be calculated as the aggregate amount of change between frame 1 and frame 2, $W_2$ can be calculated as the aggregate amount of change between from frame 2 and frame 3, $W_3$ can be calculated as the aggregate amount of change between frame 3 and frame 4, and so on.

In accordance with detecting activity within the photographic input, the time-lapse video manager 104 can select a set of one or more frames to include in the time-lapse video. In this manner, and as described in more detail, at least a portion of the frames selected for inclusion in a time-lapse video are based on extent of activity occurring in association therewith.

In embodiments, when a frame or pair of frames having a level of activity, for example W, exceeds a threshold, a frame(s) associated therewith may be selected for use in generating the time-lapse video. Such a threshold could be determined or set in any manner. For instance, the threshold could be determined to be an average of the multiple amounts of change W associated with each of the frame pairs in the photographic input.

In some cases, a global amount of change $W_G$ for the entire photographic input might be used to determine a threshold of change used for frame selection. A global amount of change $W_G$ can refer to an absolute sum or total of all amounts of change W for each pair of consecutive frames in the photographic input. In this manner, upon determining an amount of change W for each pair of frames, the absolute sum of amounts of change W for all consecutive frames in the raw footage can be calculated. Such a global amount of change $W_G$ can be used to determine a threshold of change. As one example, the global amount of change $W_G$ associated with a photographic input can be divided by T−1 to obtain a threshold of change Q, wherein T is the extent of the generated time-lapse video identified by number of frames. That is, T is the total number of frames desired for use in generating the time-lapse video. By way of example only, assume the global amount of change $W_G$ equals 50 for 1000 frames of photographic input. Further assume that the desired extent for the time-lapse video is 20 frames. In such a case, the threshold of change Q can be calculated to be 50/(20−1), which equals approximately 2.6. T can be determined in any manner, for example, based on user input of a desired amount of time or number of frames for the time-lapse video. As another example, T may be automatically determined as a default proportion of the length of the photographic input.

The calculated threshold of change Q can be used to select frames. For example, when the amount of change exceeds the threshold value Q, a corresponding frame can be selected for use in generating a time-lapse video. For instance, the amount of change $W_1$ (represented as sum S) associated with change between the first and second frame can be compared to the threshold value Q. If the amount of change $W_1$ exceeds the threshold value Q, the first and/or second frame can be selected for use in generating the time-lapse video. On the other hand, if the amount of change $W_1$ does not exceed the threshold value Q, the amount of change $W_1$ is summed with the amount of change $W_2$ corresponding with the next pair of consecutive frames, frame 2 and frame 3. The sum of $W_1$ and $W_2$ can be denoted as S. If S exceeds the threshold value Q, frame 2 and/or frame 3 can be selected for use in generating the time-lapse video. If S does not exceed the threshold value Q, a new value S can be calculated by summing $W_1$, $W_2$, and $W_3$ (corresponding with the next pair of consecutive frames, frames 3 and 4). Generally, upon the sum S of amounts of change exceeding the threshold value Q, a frame associated with the most recently included amount of change W is selected for use in generating the time-lapse video, the sum S value is reset to 0, and the process continues to identify the next frame to select for inclusion in the time-lapse video.

In some cases, void constraint can also be used in the frame selection process. As described, a void constraint refers to a video length, for instance, designated in time or number of frames, after which a frame is to be selected. That is, the void constraint is intended to avoid too much time lapsing without selecting a frame for usage in the time-lapse video. For example, if a frame has not been selected an extended period of time, such as 10 seconds, a frame can be selected upon the expiration of the void constraint (e.g., 10 seconds). In such a case, the frame can be selected and the sum S value can be reset to 0 to continue to the selection process as described.

The selected frames can be compiled to generate a time-lapse video. In embodiments, the final output time-lapse video includes T frames. The time-lapse video manager 104 can provide the generated time-lapse video for previewing or viewing. In embodiments, the time-lapse manager 104 provides the time-lapse video to the user device that requested the generation of the time-lapse video, such as user device 104. As can be appreciated, other viewers may additionally or alternatively view the generated time-lapse video.

In the event the time-lapse video is provided to the user device 104, the user device 104, for example, via the time-lapse video component 108 or other video playback component, can be used to present the time-lapse video to the user.

Figure 2:
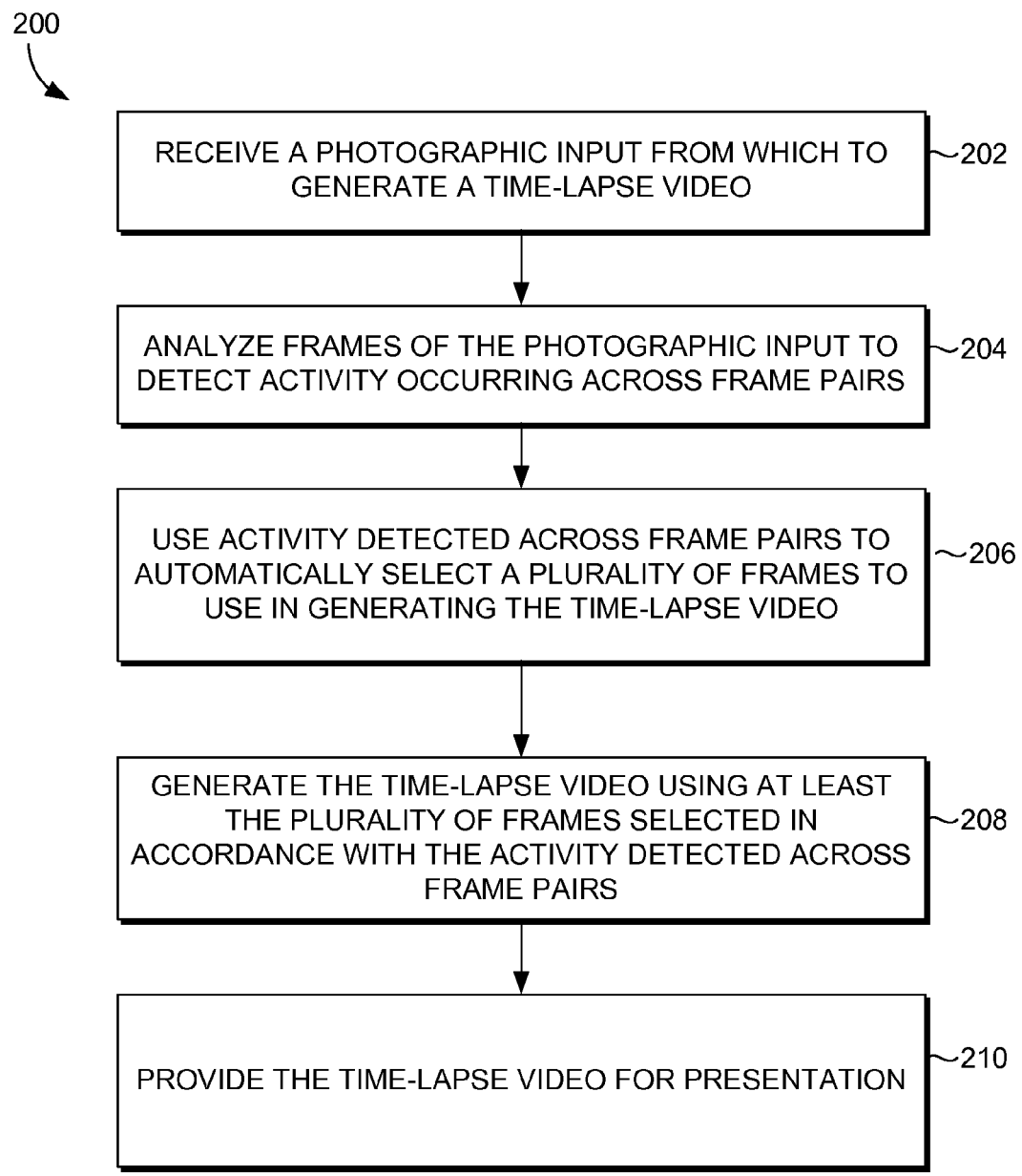
FIG. 2 is a flow diagram showing a method for facilitating generation of time-lapse videos, in accordance with embodiments of the present invention.

Turning now to FIG. 2, a flow diagram is provided that illustrates a method 200 for facilitating generating of time-lapse videos, in accordance with embodiments of the present invention. Initially, as shown at block 202, a photographic input for which a time-lapse video is to be generated is received. At block 204, frames of the photographic input are analyzed to detect activity occurring across frame pairs. Activity detected across frame pairs is utilized to automatically select a plurality of the frames to use in generating the time-lapse video, as indicated at block 206. At block 208, the time-lapse video is generated using at least the plurality of frames selected in accordance with the activity detected across frame pairs. Thereafter, as indicated at block 210, the time-lapse video is provided for presentation to a user via a user device.

Figure 3:
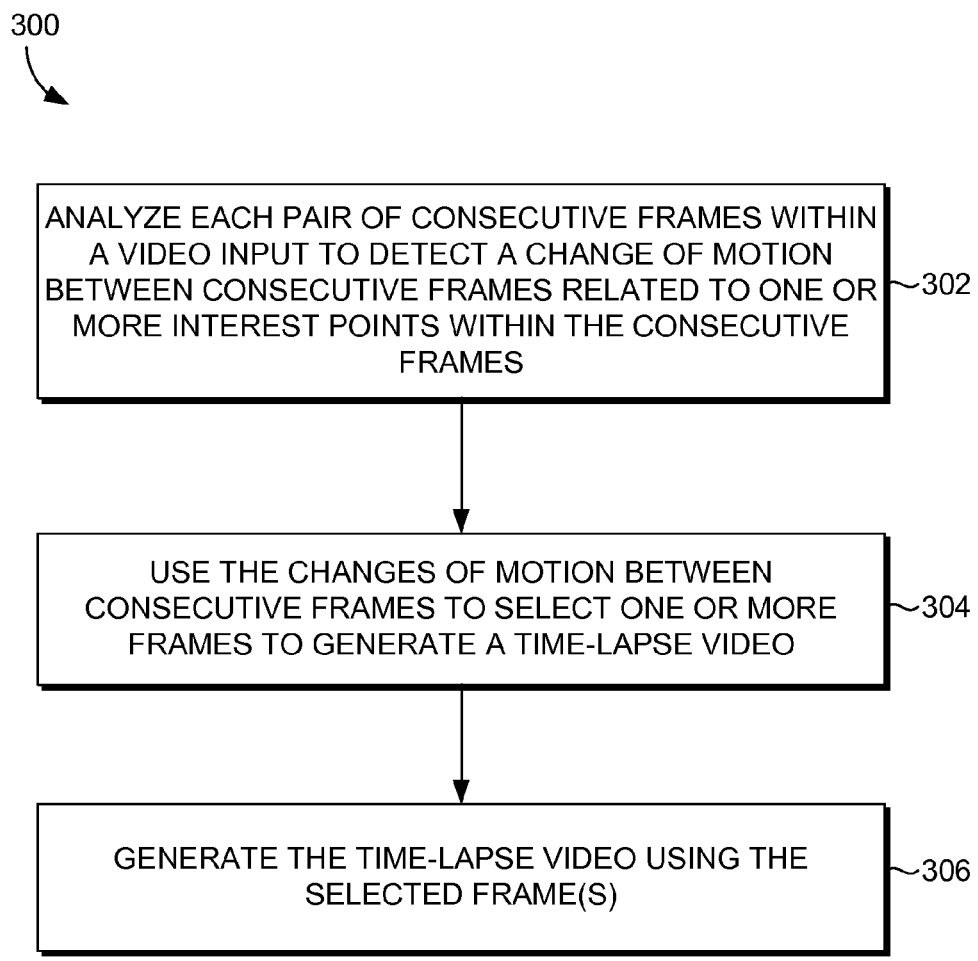
FIG. 3 is a flow diagram showing another method for facilitating generation of time-lapse videos, in accordance with embodiments of the present invention.

Turning now to FIG. 3, a flow diagram is provided that illustrates another method 300 for facilitating generation of time-lapse videos, according to embodiments provided herein. Initially, at block 302, each pair of consecutive frames within a video input are analyzed to detect a change of motion between consecutive frames related to one or more interest points within the consecutive frames. At block 304, the changes of motion between consecutive frames are used to select one or more frames to generate a time-lapse video. Thereafter, at block 306, the time-lapse video is generated using at least the selected one or more frames. Although FIG. 3 is used to illustrate a flow using movement activity, a similar process may occur using color or luminance activity in addition to or instead of movement activity.

Figure 4:
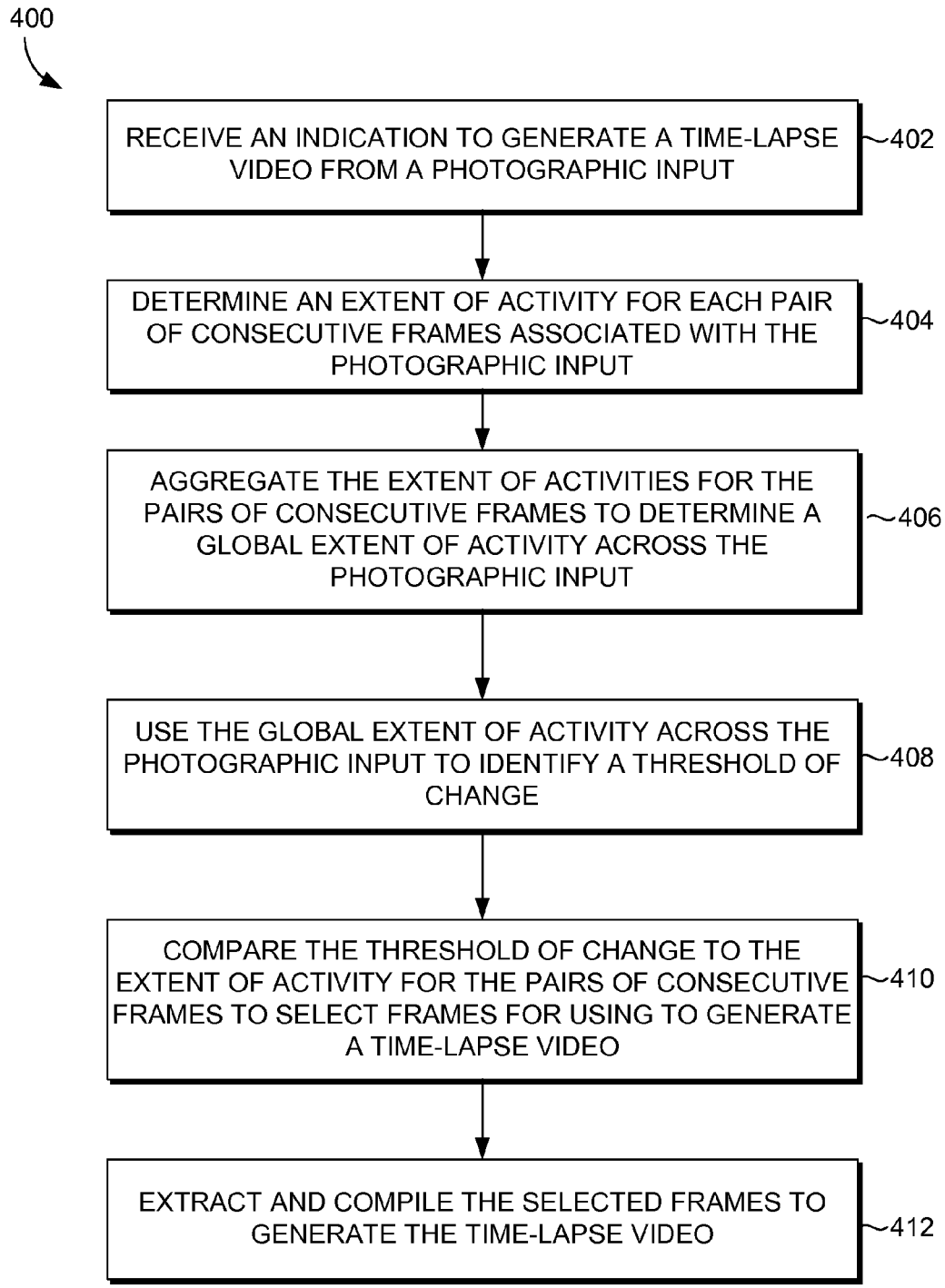
FIG. 4 is a flow diagram showing another method for facilitating generation of time-lapse videos, in accordance with embodiments provided herein.

With reference now to FIG. 4, a flow diagram is provided that illustrates another method 400 for facilitating generation of time-lapse videos in accordance with embodiments provided herein. Initially, as indicated at block 402, an indication to generate a time-lapse video from a photographic input is received. Thereafter, at block 404, for each pair of consecutive frames associated with the photographic input, an extent of activity is determined. In embodiments, the extent of activity includes a first activity associated with movement of one or more interest points across a pair of consecutive frames and a second activity associated with a color change across the pair of consecutive frames. The extent of activity for the pairs of consecutive frames is aggregated to determine a global extent of activity across the photographic input, as indicated at block 406. At block 408, the global extent of activity across the photographic input is used to identify a threshold of change. For example, the global extent of activity can be divided by one less than a desired number of frames for the time-lapse video. The threshold of change is compared to the extent of activity for the pairs of consecutive frames to select one or more frames of the photographic input for using to generate a time-lapse video. This is indicated at block 410. In embodiments, iterations from the starting frame of raw footage until the last frame can be performed. For instance, the extent of activity for consecutive pairs of frames can be summed until the activity level reaches or exceeds the threshold of change. At block 412, the one or more selected frames are extracted and compiled to generate the time-lapse video. The time-lapse video is then available for viewing and can be provided to any number of viewers.

Having briefly described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 5:
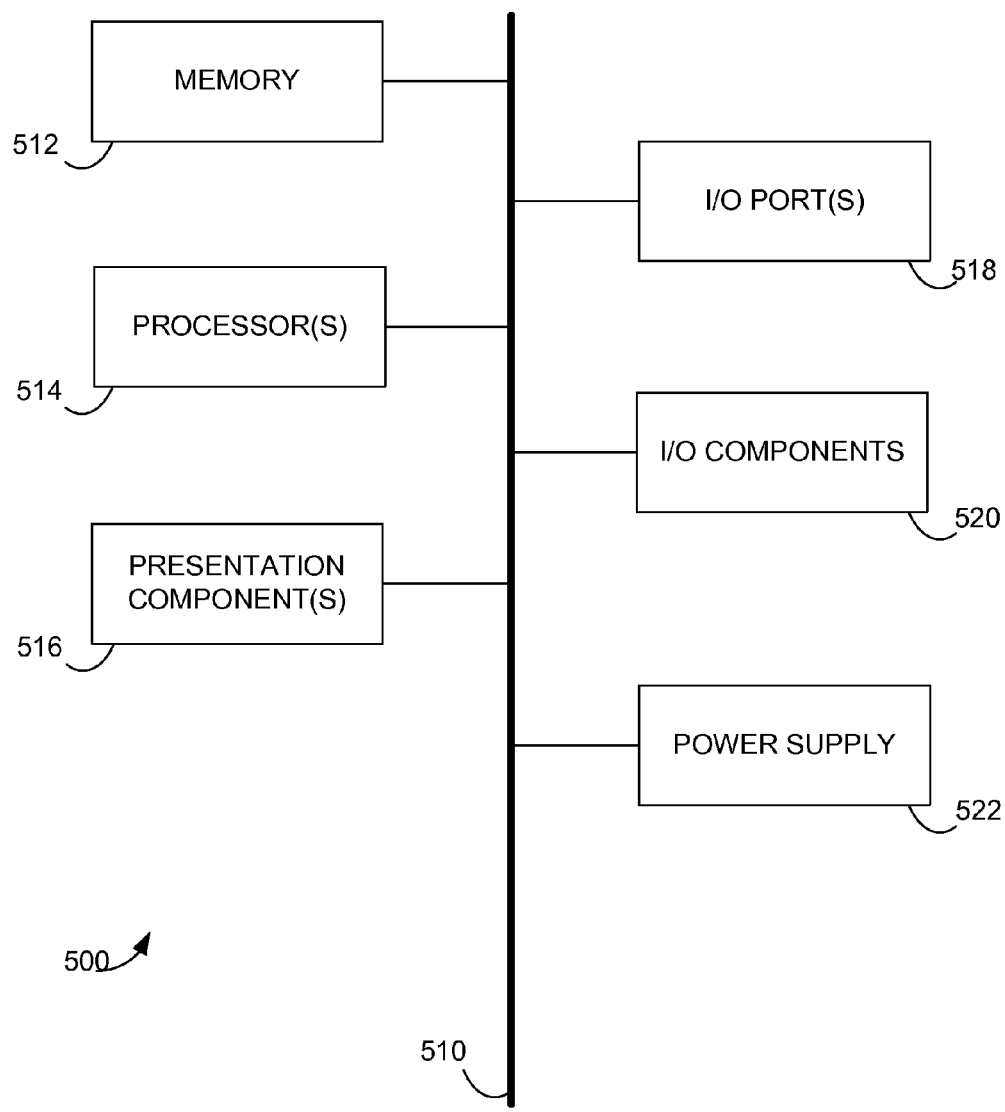
FIG. 5 is a block diagram of an exemplary computing device in which embodiments of the invention may be employed.

With reference to FIG. 5, computing device 500 includes a bus 510 that directly or indirectly couples the following devices: memory 512, one or more processors 514, one or more presentation components 516, input/output (I/O) ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be equipped with depth cameras, such as stereoscopic camera systems, infrared camera systems, RGB camera systems, touchscreen technology, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As can be understood, embodiments of the present invention provide for, among other things, facilitating generation of time-lapse videos. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations to facilitate generation of time-lapse videos, the method comprising:
   analyzing frames of a photographic input to detect activity occurring across frame pairs, the photographic input being input for which a time-lapse video is to be generated, wherein a length of the time-lapse video is shorter than a length of the photographic input;

identifying a threshold of activity change based on a function associated with the length of the time-lapse video and a global extent of activity across the frames of the photographic input, wherein the threshold of activity change is inversely correlated to the length of the time-lapse video;

utilizing the threshold of activity change and activity detected across frame pairs to automatically select a plurality of the frames to use in generating the time-lapse video; and generating the time-lapse video based on the plurality of frames.

2. The one or more computer storage media of claim 1, wherein each of the frame pairs comprises a pair of consecutive frames within the photographic input.

3. The one or more computer storage media of claim 1, wherein the photographic input comprises video input, and the length of the time-lapse video comprises a count of frames in the time-lapse video.

4. The one or more computer storage media of claim 1, wherein the activity comprises a movement of one or more interest points occurring across frame pairs.

5. The one or more computer storage media of claim 1, wherein the activity comprises a color change or luminance change occurring across frame pairs.

6. The one or more computer storage media of claim 1, wherein the plurality of frames are selected when the activity detected across frame pairs exceeds the threshold of activity change.

7. The one or more computer storage media of claim 1 further comprising providing the generated time-lapse video to a user device.

8. The one or more computer storage media of claim 1 further comprising causing display of the generated time-lapse video via a display screen.

9. A computer-implemented method to facilitate generation of a time-lapse video, the method comprising:

analyzing each pair of consecutive frames within a video input to detect a change of motion between consecutive frames related to one or more interest points within the consecutive frames;

identifying a change threshold based on a function associated with a length of the video input and a global extent of activity of the video input, wherein the change threshold is inversely correlated to the length of the time-lapse video, wherein the length of the time-lapse video is shorter than the length of the video input;

using the change threshold and the changes of motion between consecutive frames to select one or more frames to generate the time-lapse video; and generating the time-lapse video using at least the selected one or more frames.

10. The method of claim 9, wherein the one or more interest points correspond with one or more objects in motion in the video input.

11. The method of claim 9, wherein a point tracking algorithm is used to track the one or more interest points and calculate the change of motion between consecutive frames.

12. The method of claim 9, wherein the changes of motion between consecutive frames is used to select the one or more frames by comparing the changes of motion to the change threshold, wherein the one or more frames are selected when the changes of motion exceed the change threshold.

13. The method of claim 9 further comprising providing the time-lapse video for presentation.

14. A computer-implemented method to facilitate generation of time-lapse videos, the method comprising:

for each pair of consecutive frames associated with a photographic input, determining an extent of activity, wherein the extent of activity comprises a first activity associated with movement of one or more interest points across a pair of consecutive frames and a second activity associated with a color change across the pair of consecutive frames;

aggregating the extent of activity for the pairs of consecutive frames to determine a global extent of activity across the photographic input;

identifying a threshold of change based on a function associated with a length of a time-lapse video and the global extent of activity across the photographic input, wherein the length of the time-lapse video is shorter than a length of the photographic input;

comparing the threshold of change to the extent of activity for the pairs of consecutive frames to select one or more frames of the photographic input; and compiling the one or more selected frames to generate the time-lapse video.

15. The method of claim 14, wherein the threshold of change comprises the global extent of activity divided by one less than a number of frames to output in the time-lapse video.

16. The method of claim 15, wherein the number of frames to output in the time-lapse video is provided by a user or derived based on input provided by a user.

17. The method of claim 14, wherein the one or more frames are selected based on the extent of activity for a pair of consecutive frames equals or exceeds the threshold of change.

18. The method of claim 14, further comprising selecting at least one frame from the photographic input for use in generating the time-lapse video when a predetermined extent of frames are surpassed without a selection of a frame for the time-lapse video.

19. The method of claim 14, further comprising receiving a desired length for the time-lapse video and generating the time-lapse video in accordance with the desired length.

20. The method of claim 14, further comprising causing display of the time-lapse video.

* * * * *